C. H. STALL.
LOCK NUT.
APPLICATION FILED MAY 22, 1908.

913,174.

Patented Feb. 23, 1909.

Witnesses
J. C. Simpson
M. J. Miller

Inventor
Charles H. Stall

By Chandler & Chandler
Attorneys

UNITED STATES PATENT OFFICE.

CHARLES H. STALL, OF ALTOONA, PENNSYLVANIA.

LOCK-NUT.

No. 913,174.  Specification of Letters Patent.  Patented Feb. 23, 1909.

Application filed May 22, 1908. Serial No. 434,340.

*To all whom it may concern:*

Be it known that I, CHARLES H. STALL, a citizen of the United States, residing at Altoona, in the county of Blair, State of Pennsylvania, have invented certain new and useful Improvements in Lock-Nuts; and I do hereby declare the following to be a full, clear, and exact description of the invention, such as will enable others skilled in the art to which it appertains to make and use the same.

This invention relates to lock nuts and has for one of its objects to simplify and improve the construction of devices of this character.

Another object of the invention is to provide a simply constructed device of this character whereby the nut is prevented from rearward rotation upon the bolt, while at the same time the holding elements may be readily released when it is required to release the nut.

Figure 1:
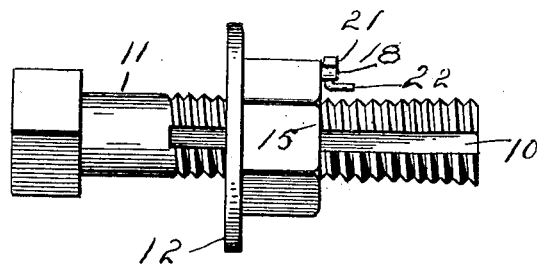
Figure 2:
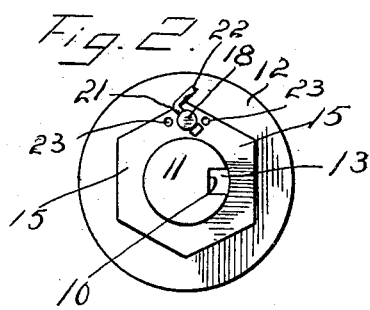
Figure 4:
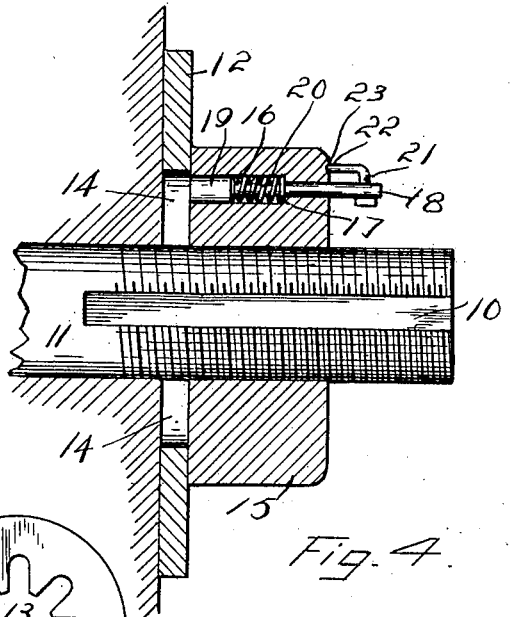
Figure 3:
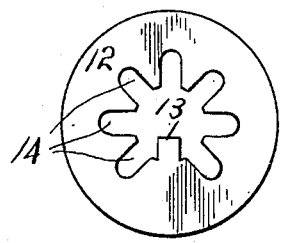

With these and other objects in view the invention consists in certain novel features of construction as hereafter shown and described, and then specifically pointed out in the claim, and in the drawings illustrating the preferred embodiment of the invention, Figure 1 is a side elevation of a bolt and its nut with the improved locking means applied. Fig. 2 is a plan view of the same. Fig. 3 is a perspective view of the washer portion of the improved device, detached. Fig. 4 is an enlarged sectional detail, illustrating the manner of arranging the parts when the nut is to be removed or while it is being turned " home ".

The improved device comprises a longitudinal slot 10 formed in the bolt 11 transversely of the threads, and this is the only change made in the bolt portion of the device. Bearing over the bolt is a washer 12 having an inwardly projecting fin 13 adapted to engage the slot 10, and with a plurality of radiating recesses 14 opening into the interior of the washer and extending entirely therethrough.

The nut represented at 15 is provided with an aperture 16 extending therethrough and in parallel relation to the threaded aperture of the nut, the aperture being counterbored for a portion of its distance to form a shoulder 17 near the outer face of the nut.

Slidably disposed in the aperture 16 is a locking pin 18 enlarged at the inner end 19 to fit the larger portion of the aperture 16, and with the smaller portion of the pin extending through the smaller portion of the aperture 16, and likewise extending for some distance beyond the outer face of the nut. Surrounding the pin 18 within the larger portion of the aperture 16 is a spring 20 operating to maintain the pin yieldably in its projected position.

The recesses 14 are arranged concentric with the interior opening of the washer and concentric to the outer face of the bolt and the threaded aperture of the nut and the larger portion 19 of the pin is adapted to enter these recesses successively, and thus lock the nut to the washer, while the washer is locked to the bolt by means of the fin 13 engaging the slot 10. The recesses 14 it will be noted extend entirely through the washer and with their sides at right angles to the faces of the washer, so that the bearing surface of the recess is equal to the thickness of the washer, so that the bolt 19 bears with the full size of its larger end against the whole thickness of the washer, and effectually prevents rotation of the washer in either direction. The nut is thus firmly supported from movement in either direction and its utility and efficiency thereby materially improved.

Extending through the outer free end of the pin 18 is a stop pin 21 having a lateral offset 22 adapted to engage the outer face of the nut when the pin is in withdrawn position, and thus lock the pin in its withdrawn position. The face of the nut will be provided with slight depressions 23 adjacent to the pin 18 to receive the lower terminals of the locking pin 22 and thus hold the pin 18 in its withdrawn position. By this arrangement it will be obvious that when the nut is to be turned down or set " home " by the wrench, the pin 18 is withdrawn and the stop pin 21 adjusted with its terminal in one of the recesses 23 and thus hold the pin 18 in withdrawn position so that the nut can be freely rotated upon the bolt. When the nut is set in its required position, the stop pin 21—22 is released to enable the spring 20 to force the enlarged head 19 of the pin 18 into the nearest of the recesses 14, and thus firmly lock the nut to the bolt. By providing a plurality of the recesses 14 the nut is required to be turned only a very short distance to enable it to be firmly locked in position.

The washer can be stamped from sheet metal, preferably steel, and the groove or slot 10 can be cut with a milling tool and the aperture for the pin 18 produced by a counterboring drill so that the expense of manufacture will be slight, and will not materially increase the expense over an ordinary tool, as the washer can be produced at no greater expense than that required to produce ordinary washers after the dies are manufactured, while the only additional expense would be for boring the aperture 16 and forming the pins 18—21, which would be very slight.

When the nut is to be detached it is only necessary, as before stated, to withdraw the pin 18 and hold it in withdrawn position by the pin 21—22 and rotate the nut backwardly and remove it.

The improved device may be employed to nuts and bolts of all the various sizes.

What is claimed, is:—

In a lock nut, a bolt having a longitudinal slot in its threaded end, a washer having an inwardly projecting fin to engage said slot and with radially disposed recesses opening into the interior of the washer and extending entirely through the same, a nut having an aperture parallel to its threaded aperture and counterbored for a portion of its length, a lock pin slidable through the smaller portion of said aperture and with an enlarged terminal engaging the larger portion of the aperture and adapted to successively engage said radial recesses and extending entirely through the same, and a stop pin swinging through said locking pin and with its outer portion extended laterally and adapted to bear upon the face of the nut and support the lock pin in withdrawn position.

In testimony whereof, I affix my signature, in presence of two witnesses.

CHARLES H. STALL.

Witnesses:
 C. J. McCullough,
 P. M. Swanger.